United States Patent
You et al.

(10) Patent No.: US 11,750,265 B2
(45) Date of Patent: *Sep. 5, 2023

(54) METHOD FOR INDICATING BEAM FAILURE RECOVERY, DEVICE, AND STORAGE MEDIUM

(71) Applicant: GUANGDONG OPPO MOBILE TELECOMMUNICATIONS CORP., LTD., Dongguan (CN)

(72) Inventors: Xin You, Dongguan (CN); Cong Shi, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/866,406

(22) Filed: Jul. 15, 2022

(65) Prior Publication Data

US 2022/0352965 A1 Nov. 3, 2022

Related U.S. Application Data

(63) Continuation of application No. 17/146,953, filed on Jan. 12, 2021, now Pat. No. 11,444,678, which is a (Continued)

(51) Int. Cl.
*H04B 7/06* (2006.01)
*H04W 76/19* (2018.01)
(Continued)

(52) U.S. Cl.
CPC .......... *H04B 7/0695* (2013.01); *H04W 76/19* (2018.02); *H04W 80/02* (2013.01)

(58) Field of Classification Search
CPC .. H04B 7/0695; H04B 7/0602; H04B 7/0639; H04W 76/19; H04W 80/02; H04W 74/08;
(Continued)

(56) References Cited

U.S. PATENT DOCUMENTS 11,444,678 B2 * 9/2022 You ..................... H04B 7/0695
11,523,301 B2 * 12/2022 Touboul ................ H04L 1/1671
(Continued)

FOREIGN PATENT DOCUMENTS

CN 107733497 A 2/2018
EP 0373699 A1 6/1990
(Continued)

OTHER PUBLICATIONS

Guangdong OPPO Mobile Telecommunications Corp. Ltd., Office Action and Search Report, EP18925961.7, dated Sep. 6, 2022, 7 pgs.
(Continued)

*Primary Examiner* — Harry H Kim
(74) *Attorney, Agent, or Firm* — Morgan, Lewis & Bockius LLP

(57) ABSTRACT

Disclosed by the present invention is a method for indicating beam failure recovery, comprising: when conditions for triggering beam failure recovery are met, a terminal device sending a media access control (MAC) control element (CE), the MAC CE indicating a beam index corresponding to a beam used by a network device to send a feedback message. Further disclosed by the present invention are another method for indicating beam failure recovery, a terminal device, a network device, and a storage medium.

8 Claims, 3 Drawing Sheets

Related U.S. Application Data continuation of application No. PCT/CN2018/095643, filed on Jul. 13, 2018.

(51) Int. Cl.
*H04W 80/02* (2009.01)
*H04W 74/08* (2009.01)
*H04W 24/04* (2009.01)

(58) Field of Classification Search
CPC ... H04W 24/04; H04W 72/046; H04W 72/21; H04W 72/23; H04W 72/02; H04W 72/20
See application file for complete search history.

(56) References Cited

U.S. PATENT DOCUMENTS

| | | | |
|---|---|---|---|
| 11,528,630 B2* | 12/2022 | Zhu | H04B 17/101 |
| 11,539,419 B2* | 12/2022 | Jung | H04W 74/006 |
| 2018/0192371 A1 | 7/2018 | Jung et al. | |
| 2019/0238210 A1* | 8/2019 | Tang | H04B 17/318 |
| 2020/0322030 A1* | 10/2020 | Yuan | H04B 7/0626 |
| 2020/0344621 A1* | 10/2020 | Xu | H04W 28/0278 |
| 2021/0007127 A1* | 1/2021 | Hwang | H04L 1/0071 |
| 2021/0068162 A1* | 3/2021 | Agiwal | H04L 41/0668 |
| 2021/0092731 A1 | 3/2021 | Wu | |
| 2021/0194642 A1* | 6/2021 | Belleschi | H04W 28/0278 |

FOREIGN PATENT DOCUMENTS

| | | |
|---|---|---|
| EP | 3736999 A1 | 11/2020 |
| WO | WO2017221202 A1 | 12/2017 |
| WO | WO2018129300 A1 | 7/2018 |
| WO | WO2019130523 A1 | 7/2019 |
| WO | WO2020010615 A1 | 1/2020 |

OTHER PUBLICATIONS

Guangdong OPPO Mobile Telecommunications Corp. Ltd., Office Action and Search Report, EP18925961.7, dated Jun. 9, 2022, 7 pgs.
Guangdong OPPO Mobile Telecommunications Corp. Ltd., International Search Report and Written Opinion, PCT/CN2018/095643, dated Apr. 4, 2019, 14 pgs.
Guangdong OPPO Mobile Telecommunications Corp. Ltd., First Office Action, CN202110245624.X, 1, dated Apr. 13, 2022, 17 pgs.
Guangdong OPPO Mobile Telecommunications Corp. Ltd., Extended European Search Report, EP18925961.7, dated May 20, 2021, 10 pgs.
Guangdong OPPO Mobile Telecommunications Corp. Ltd., Examination Report, IN202127001474, dated Jul. 31, 2021, 6 pgs.
Guangdong OPPO Mobile Telecommunications Corp. Ltd., Notice of Reasons for Refusal, JP2021-500844, dated Jul. 8, 2022, 10 pgs.
Huawei, HiSilicon, "RAN2 aspects of DL beam management," 3GPP TSG-RAN WG2#99bis, R2-1710562, Prague, Czech Republic, Oct. 9-13, 2017, 4 pgs.
Huawei, HiSilicon, "Consideration on RAN2 impact of beam management," 3GPP TSG-RAN WG2 Meeting #98, R2-1704862, Hangzhou, China, May 15-19, 2017, 5 pgs.
InterDigital Inc., BFR on SCell, 3GPP TSG-RAN WG2, RAN2#102, R2-18036821, Busan, Republic of Korea, May 21-25, 2018, 2 pgs.
InterDigital Inc., Corrections on BFR for SCell, 3GPP TSG-RAN WG2, Meeting #102, R2-1806822, Busan, Republic of Korea, May 21-25, 2018, 3 pgs.
MediaTek Inc., Summary 2 on Remaining issues on Beam Failure Recovery, 3GPP TSG-RAN WG1 Meeting #93, R1-1807796, Busan, Korea, May 21-25, 2018, 29 pgs.
You, Office Action, U.S. Appl. No. 17/146,953, dated Feb. 1, 2022, 14 pgs.
You, Notice of Allowance, U.S. Appl. No. 17/146,953, dated May 20, 2022, 11 pgs.
Guangdong OPPO Mobile Telecommunications Corp. Ltd., JP2021-500844, Second Office Action, dated Jan. 27, 2023, 6 pgs.
Mediatek Inc., "Draft CR for beam failure recovery procedure", R2-1800660, 3GPP TSG-RAN WG2 Meeting AH-1801, Vancouver, Canada, Jan. 22-26, 2018, 7 pgs.
Guangdong OPPO Mobile Telecommunications Corp. Ltd., EP18925961.7, Summons to attend Oral Proceedings, dated Mar. 13, 2023, 12 pgs.
Samsung, "MAC Impacts: Beam Failure Recovery for Scell", R2-1804303, 3GPP TSG-RAN2 101bis, Sanya, China, Apr. 16-Apr. 20, 2018, 8 pgs.

* cited by examiner sending, by a terminal device, a media access control MAC control element CE, the MAC CE indicating a beam index corresponding to a beam used for sending a feedback message by a network device — S101

FIG. 1 sending, by a terminal device, a media access control MAC control element CE, the MAC CE indicating a beam index corresponding to a beam used for sending a feedback message by a network device — S101 receiving, by the terminal device, the feedback message — S102 determining, by the terminal device, whether the BFR is successful based on the feedback message — S103 resending, by the terminal device, the MAC CE after determining that the BFR fails, or entering, by the terminal device, a random access process for BFR after determining that the BFR fails — S104

FIG. 2 receiving, by a network device, a MAC CE sent by a terminal device — S201 sending, by the network device, a feedback message to the terminal device based on a beam corresponding to a beam index indicated by the MAC CE — S202

FIG. 3

METHOD FOR INDICATING BEAM FAILURE RECOVERY, DEVICE, AND STORAGE MEDIUM

CROSS-REFERENCE TO RELATED APPLICATIONS

The present application is a continuation application of U.S. application Ser. No. 17/146,953, which is based upon International Application No. PCT/CN2018/095643, filed on Jul. 13, 2018, the contents of which are hereby incorporated by reference in their entirety.

TECHNICAL FIELD

The present invention relates to the field of wireless communication technologies, and in particular to a method and device for indicating beam failure recovery, and storage medium.

BACKGROUND

In the 5th Generation (5G) New Radio (NR) system, a beam management mechanism including a beam failure recovery (BFR) is introduced.

SUMMARY

The present invention provide a method for indicating BFR.

In the first aspect, embodiments of the present invention provide a method for indicating BFR, which includes: when a condition for triggering BFR is met, sending, by a terminal device, a media access control (MAC) control element (CE), the MAC CE indicating a beam index corresponding to a beam used for sending a feedback message by a network device.

In a second aspect, embodiments of the present invention provide a method for indicating BFR, including: receiving, by a network device, a MAC CE sent by a terminal device; and sending, by the network device, a feedback message to the terminal device based on a beam corresponding to a beam index indicated by the MAC CE;

wherein the feedback message is used for determining whether the BFR is successful by the terminal device.

In a third aspect, embodiments of the present invention provide a terminal device, including: a processor and a memory for storing a computer program running on the processor, wherein:

the processor is configured to execute steps of the above method for instructing beam failure recovery executed by the terminal device when running the computer program.

In a fourth aspect, embodiments of the present invention provide a network device, including: a processor and a memory for storing a computer program running on the processor, wherein:

the processor is configured to execute steps of the above method for instructing beam failure recovery executed by the network device when running the computer program.

In a fifth aspect, embodiments of the present invention provide a storage medium that stores an executable program, and when the executable program is executed by a processor, the above method for indicating beam failure recovery executed by the terminal device described above is implemented.

In a sixth aspect, embodiments of the present invention provide a storage medium that stores an executable program, and when the executable program is executed by a processor, the above method for indicating beam failure recovery executed by the terminal device described above is implemented.

BRIEF DESCRIPTION OF THE DRAWINGS

FIG. 1 is a schematic diagram of a first optional processing flow of a method for indicating BFR applied to a terminal device provided by an embodiment of the present invention;

FIG. 2 is a schematic diagram of a second optional processing flow of a method for indicating BFR applied to a terminal device provided by an embodiment of the present invention;

FIG. 3 is a schematic diagram of a first optional processing flow of a method for indicating BFR applied to a network device provided by an embodiment of the present invention;

DETAILED DESCRIPTION

Figure 4:
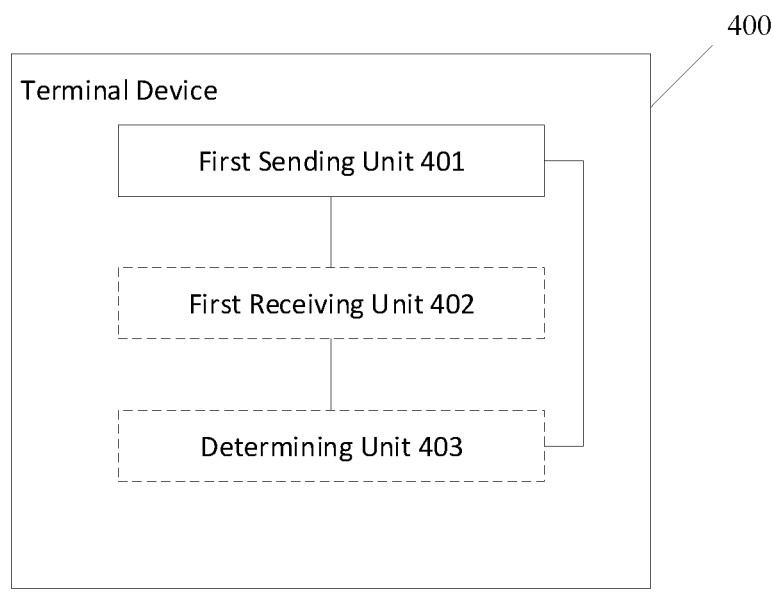
FIG. 4 is a schematic diagram of a composition structure of a terminal device provided by an embodiment of the present invention.

In order to understand features and technical content of embodiments of the present invention in more detail, implementations of the embodiments of the present invention will be described in detail below with reference to the accompanying drawings. The accompanying drawings are only for purposes of reference and explanation, and are not used for limiting the embodiments of the present invention.

Before describing the embodiments of the present invention in detail, a brief introduction is made to the processing flow for BFR in the related art.

In the related art, a terminal device can notify a network device which downlink beam to use for sending a random access response (RAR) by means of random access, so as to restore the downlink beam. A random access preamble in the NR system is configured by per single slide band (SSB); the terminal device first selects the SSB meeting a threshold condition by comparing reference signal receiving power (RSRP), or selects a channel state information-reference signal (CSI-RS) with an associated relationship with the SSB, and then uses the corresponding preamble on the SSB and a physical random access channel (PRACH) resource to send a message 1 (Msg1), which can be understood as the network device knowing which SSB is used to feed back the RAR after receiving the preamble.

In the related art, the random access process based on BFR includes the following manners:

1. contention based random access (CFRA) BFR: the radio resource control (RRC) configures the CFRA resource associated with SSB for BFR, and there are SSBs that meet the threshold.

2. contention-free based random access (CBRA) BFR fallback from CFRA BFR includes two cases:

a first case is that RRC configures the CFRA resource associated with SSB for BFR, but there is no SSB that meets the threshold;

a second case is a beam failure recovery timer is timeout, and UE can only use CBRA BFR.

3. CBRA BFR: RRC does not configure beam failure recovery Config.

For a MAC entity, whenever a physical layer reports a beam failure instance, the terminal device adds 1 to a counter BFI_COUNTER, and restarts a beam failure detection timer; if the BFI_COUNTER reaches a maximum value during operation of the beam failure detection timer, it is considered as beam failure and a random access procedure is initiated. For CFRA BFR, the network device will configure BFR Config IE, and the terminal device may use parameters in the IE for random access. For CBRA BFR, if the BFR Config IE is configured, power ramping step, preamble received target power, and preamble Trans Max configured in the IE are used for random access; otherwise, a normal RACH process is used. If the random access process is successful, it is considered that the BFR process is successful.

The applicant found in the process of implementing BFR that the BFR based on the random access process needs to determine whether the network device configures BFR Config. When the network device does not configure BFR Config, the beam needs to be screened, and the normal random access is performed according to the screening result to notify the network device which beam to use for BFR; when the network device configures BFR Config, the parameters configured in the IE are used for random access to notify the network device which beam to use for BFR; regardless of whether the network device configures BFR Config, the delay required for the random access process is relatively long.

A first optional processing flow of a method for indicating BFR applied to a terminal device provided by embodiments of the present invention, as shown in FIG. 1, includes the following steps:

In step S101, the terminal device sends a MAC CE, the MAC CE indicating a beam index corresponding to a beam used for sending a feedback message by a network device.

In some embodiments, the physical layer reports the beam failure instance to the terminal device, and the terminal device sends the MAC CE for BFR to the network device when determining that the condition for triggering BFR is met.

Here, before sending the MAC CE, the terminal device needs to determine whether it can send the MAC CE; in a specific implementation, the terminal device can send the MAC CE by determining whether there are available resources; when it is determined that there are available resources, the terminal device sends the MAC CE. The resources used by the terminal device to send MAC CE are configured based on scheduling or by using semi-static resource. The beam index can be indicated by SSB Index or CSI-RS Index.

Since the MAC CE sent by the terminal device indicates the beam index corresponding to the beam used for sending the feedback message by the network device, the terminal device needs to pre-determine the downlink beam that meets a threshold condition. The downlink beam that meets the threshold condition is: a beam with reference signal receiving power of CSI-RS above a threshold of the reference signal receiving power in a candidate beam RS list; or a beam with synchronization signal receiving power of single slide band SS-RSRP above the threshold of the reference signal receiving power.

A second optional processing flow of a method for indicating BFR applied to a terminal device provided by the embodiments of the present invention is similar to the first optional processing flow above, as shown in FIG. 2, differences between the two optional processing flows are in that the second optional processing flow further includes, after step S101:

In step S102, the terminal device receives the feedback message.

In some embodiments, the feedback message is sent by the network device based on the beam corresponding to the beam index indicated by the MAC CE.

In step S103, the terminal device determines whether the BFR is successful based on the feedback message.

In some embodiments, the feedback message is downlink scheduling information; when the downlink scheduling information sent by the network device is received, the terminal device determines that the BFR is successful; the terminal device determines that the BFR is failed when the downlink scheduling information sent by the network device is not received.

In a specific implementation, the terminal device starts a timer after sending the MAC CE; if the downlink scheduling information sent by the network device is received during the operation of the timer, the terminal device determines that the BFR is successful; if the terminal device does not receives the downlink scheduling information sent by the network device during the operation of the timer, it is determined that the BFR fails.

In the embodiments of the present invention, the downlink scheduling information may be sent based on a physical downlink control channel (PDCCH) scrambled by a cell-radio network temporary identity (C-RNTI); of course, the downlink scheduling information can also be sent based on PDCCH scrambled in other ways.

In step S104: after determining that the BFR fails, the terminal device resends the MAC CE or the terminal device enters the random access process to perform BFR after determining that the BFR fails.

In the embodiments of the present invention, after determining that the BFR fails, the terminal device may determines whether there are available resources to resend the MAC CE for BFR, or perform BFR by the random access process. When determining that BFR is performed by resending the MAC CE, the terminal device resends the MAC CE. When determining that BFR is performed by the random access process, the terminal device enters the random access process.

A first optional processing flow of a method for indicating BFR applied to a network device provided by the embodiments of the present invention, as shown in FIG. 3, includes the following steps:

In step S201, the network device receives a MAC CE sent by the terminal device.

Here, the MAC CE indicates the beam index corresponding to the beam used for the network device to send the feedback message.

In step S202, the network device sends a feedback message to the terminal device based on a beam corresponding to a beam index indicated by the MAC CE.

Here, the feedback message is used by the terminal device to determine whether the BFR is successful; the feedback message is downlink scheduling or PDCCH, and the PDCCH may be a PDCCH scrambled by C-RNTI.

Based on the method for indicating BFR above, the embodiments of the present invention also provide a terminal device. A schematic diagram of a composition structure of the terminal device is shown in FIG. 4, and the terminal device 400 includes:

a first sending unit 401, configured to send a MAC CE when a condition for triggering beam failure recovery BFR is met; and the MAC CE indicates a beam index corresponding to a beam used for sending a feedback message by a network device.

In some embodiments, the terminal device 400 further includes: a first receiving unit 402, configured to receive a feedback message, and the feedback message is sent by the network device based on the beam corresponding to the beam index indicated by the MAC CE.

In some embodiments, the terminal device 400 further includes: a determining unit 403, configured to determining whether the BFR is successful based on the feedback message.

In some embodiments, the determining unit 403 is configured to start a timer after the first sending unit sends the MAC CE; if the downlink scheduling information sent by the network device is received during the operation of the timer, it is determined that the BFR is successful; if the downlink scheduling information sent by the network device is not received during the operation of the timer, it is determined that the BFR fails.

In some embodiments, the determining unit 403 is configured to determine that the BFR is successful when the first receiving unit 402 receives the downlink scheduling information sent by the network device, and to determine that the BFR fails when the first receiving unit 402 does not receive the downlink scheduling information sent by the network device.

In some embodiments, the first sending unit 401 is further configured to resend the MAC CE after the determining unit determines that the BFR fails, and the MAC CE indicates the beam index corresponding to the beam used by the network device to send the feedback message.

In some embodiments, the determining unit 403 is further configured to determine the downlink beam that meets a threshold condition; and taking the downlink beam that meets the threshold condition as the beam corresponding to the beam index indicated by the MAC CE.

In some embodiments, the resources used by the first sending unit 401 to send the MAC CE are configured based on scheduling or by using semi-static resource.

In some embodiments, the first sending unit 401 is further configured to determine whether it is able to send the MAC CE before sending the MAC CE.

In a specific implementation, the MAC CE can be sent by determining whether there are available resources; when it is determined that there are available resources, the first sending unit 401 sends the MAC CE.

Figure 5:
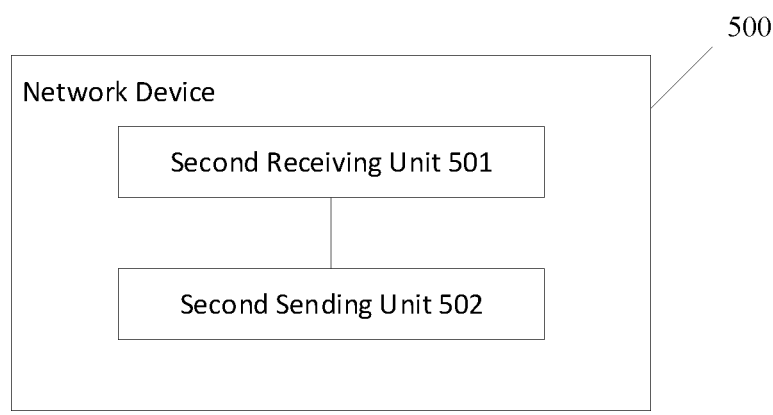
FIG. 5 is a schematic diagram of a composition structure of a network device provided by an embodiment of the present invention.

Based on the method for indicating BFR above, embodiments of the present invention also provide a network device. A schematic diagram of a composition structure of the network device is shown in FIG. 5, and the network device 500 includes:

a second receiving unit 501, configured to receive the MAC CE sent by the terminal device;

a second sending unit 502, configured to send a feedback message to the terminal device based on a beam corresponding to a beam index indicated by the MAC CE; the feedback message is used by the terminal device to determine whether the BFR is successful.

Figure 6:
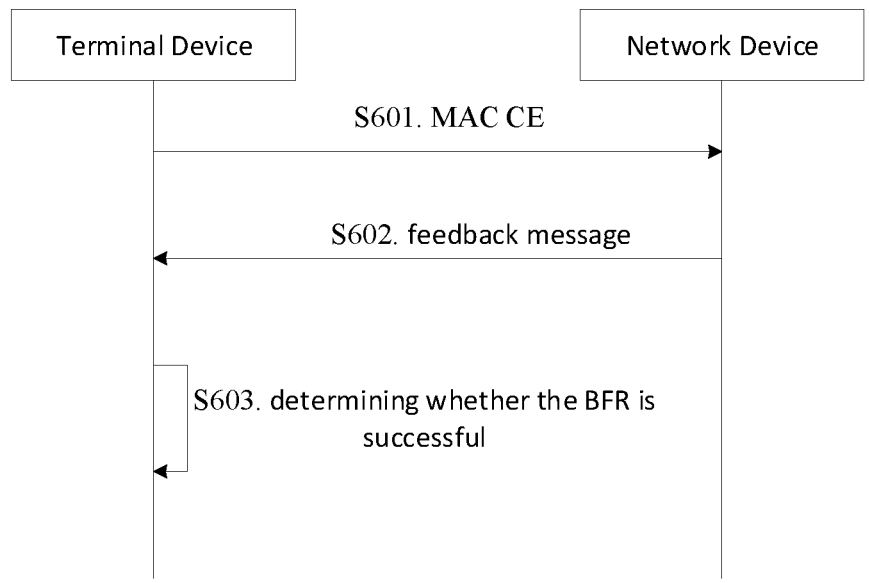
FIG. 6 is a schematic diagram of an optional processing flow of a method for indicating BFR applied to a network system provided by an embodiment of the present invention.

An optional processing flow of a method for indicating BFR applied to a network system provided by the embodiments of the present invention, as shown in FIG. 6, includes the following steps:

In step S601, the terminal device sends a MAC CE to the network device.

Here, the MAC CE indicates the beam index corresponding to the beam used by the network device to send the feedback message.

In step S602, the network device sends the feedback message to the terminal device according to the beam corresponding to the beam index indicated by the MAC CE.

In step S603, the terminal device determines whether the BFR is successful according to the feedback message.

In some embodiments, the terminal device determines that the BFR is successful when the downlink scheduling information sent by the network device is received; the terminal device determines that the BFR fails when it does not receive the downlink scheduling information sent by the network device.

In a specific implementation, the terminal device starts a timer after sending the MAC CE; if the downlink scheduling information sent by the network device is received during the operation of the timer, the terminal device determines that the BFR is successful; if the terminal device does not receives the downlink scheduling information sent by the network device during the operation of the timer, it is determined that the BFR fails.

In the embodiments of the present invention, the downlink scheduling information may be sent based on the PDCCH scrambled by the C-RNTI; of course, the downlink scheduling information may also be sent based on the PDCCH scrambled in other ways.

Figure 7:
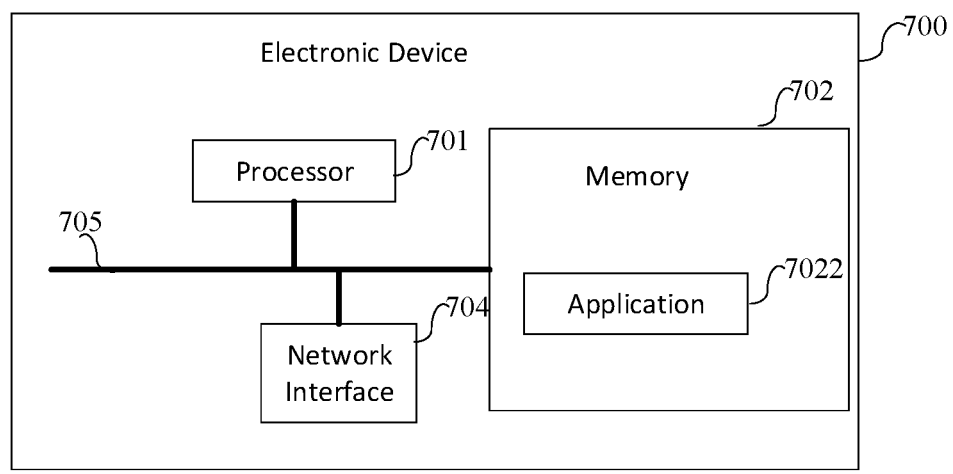
FIG. 7 is a schematic diagram of a hardware composition structure of an electronic device provided by an embodiment of the present invention.

FIG. 7 is a schematic diagram of a hardware composition structure of an electronic device (network device or user equipment) according to an embodiment of the present invention. The electronic device 700 includes: at least one processor 701, a memory 702, and at least one network interface 704. Various components in the electronic device 700 are coupled together by a bus system 705. It can be understood that the bus system 705 is configured to implement connection and communication between these components. In addition to a data bus, the bus system 705 also includes a power bus, a control bus, and a status signal bus. However, for clarity of description, various buses are marked as the bus system 705 in FIG. 7.

It should be understood that, the memory 702 may be a volatile memory or a non-volatile memory, or may include both a volatile memory and a non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a ferromagnetic surface memory, optical disk, or an optical disk, or a compact disc read-only memory (CD-ROM); the ferromagnetic surface memory can be a disk memory or a tape memory. The volatile memory may be a random access memory (RAM), and is used as an external cache. By way of examples but of no limitation, many forms of RAM are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct Rambus random access memory (DRRAM). The memory 702 described in the embodiment of the present invention is intended to include but is not limited to these memories and any other suitable type of memory.

The memory 702 in the embodiments of the present invention is configured to store various types of data to support the operations of the electronic device 700. Examples of these data include: any computer program used for operating on the electronic device 700, such as an application 7022. The program for implementing the method of the embodiments of the present invention may be included in the application 7022.

The method disclosed in the above embodiments of the present invention may be applied to the processor 701 or implemented by the processor 701. The processor 701 may be an integrated circuit chip, has a signal processing capability, the steps of the foregoing method embodiment may be implemented by using a hardware integrated logic circuit in the processor 701 and/or implemented by using an instruction in a software form. The foregoing processor 701 may be a general purpose processor, a digital signal processor (DSP) or another programmable logic device, a transistor logic device, or a discrete hardware component. The processor 701 may implement or execute the methods, steps, and logical block diagrams disclosed in the embodiments of the present invention. The general purpose processor may be a microprocessor, or may be any conventional processor, or the like. Steps of the methods disclosed with reference to the embodiments of the present invention may be directly executed and completed by means of a hardware decoding processor, or may be executed and completed by using a combination of hardware and software modules in the decoding processor. The software module may be located in a storage medium, and the storage medium is located in the memory 702, and the processor 701 reads information in the memory 702 and completes the steps in the foregoing method embodiments in combination with hardware of the processor.

In an exemplary embodiment, the electronic device 700 may be implemented by one or more application specific integrated circuits (ASIC), DSP, programmable logic devices (PLD), and complex programmable logic devices (CPLD), FPGA, general-purpose processors, controllers, MCUs, MPUs, or other electronic components to implement the aforementioned method.

The present invention is described with reference to flowcharts and/or block diagrams of the methods, the device (system), and the computer program product according to the embodiments of the present invention. It should be understood that each process and/or block in the flowchart and/or block diagram, and the combination of processes and/or blocks in the flowchart and/or block diagram can be implemented by computer program instructions. These computer program instructions can be provided to the processor of a general-purpose computer, a special-purpose computer, an embedded processing machine or other programmable data processing devices to generate a machine, so that the instructions executed by the processor of the computer or other programmable data processing devices generate means for realizing the functions specified in one or more processes in the flowchart and/or one or more blocks in the block diagram.

These computer program instructions can also be stored in a computer-readable memory that can guide a computer or other programmable data processing devices to work in a specific manner, so that the instructions stored in the computer-readable memory generate an article of manufacture including the instruction device, and the instruction device realizes the functions specified in one or more processes in the flowchart and/or one or more blocks in the block diagram.

These computer program instructions can also be loaded on a computer or other programmable data processing devices, so that a series of operation steps are executed on the computer or other programmable devices to produce computer-implemented processing, so that instructions executed on the computer or other programmable devices provide steps for implementing the functions specified in one or more processes in the flowchart and/or one or more blocks in the block diagram.

The foregoing descriptions are only the preferred embodiments of the present invention and are not used to limit the protection scope of the present invention. Any modification, equivalent replacement and improvement, etc. made within the spirit and principle of the present invention should be included in the protection scope of the present invention.

What is claimed is:

1. A method for indicating beam failure recovery (BFR), the method comprising:
when a condition for triggering BFR is met, sending, by a terminal device, a media access control (MAC) control element (CE), the MAC CE indicating a beam index corresponding to a beam used for sending a feedback message by a network device; and
receiving, by the terminal device, the feedback message, the feedback message being sent by a network device based on the beam corresponding to the beam index indicated by the MAC CE,
wherein the method further comprises determining, by the terminal device, whether the BFR is successful based on the feedback message, further including:
determining, by the terminal device, that the BFR is successful when downlink scheduling information sent by the network device is received, wherein the downlink scheduling information is sent by the network device based on a physical downlink control channel (PDCCH) scrambled by a cell-radio network temporary identity (C-RNTI), and
wherein before sending, by the terminal device, the MAC CE, the method further comprises:
determining, by the terminal device, a downlink beam that meets a threshold condition; and
taking the downlink beam that meets the threshold condition as the beam corresponding to the beam index indicated by the MAC CE, wherein resources used by the terminal device to send the MAC CE are configured based on dynamic scheduling or by using semi-static resources.

2. The method according to claim 1, wherein the determining, by the terminal device, whether the BFR is successful based on the feedback further message comprises:
determining, by the terminal device, that the BFR fails when the downlink scheduling information sent by the network device is not received.

3. The method according to claim 1, wherein the beam index is indicated by a channel state information-reference signal (CSI-RS) index.

4. A method for indicating beam failure recovery (BFR), comprising:
sending, by a network device resources to a terminal device for the terminal device to send a media access control (MAC) control element (CE) using dynamic scheduling or semi-static resources;

receiving, by the network device, the MAC CE sent by the terminal device; and sending, by the network device, a feedback message to the terminal device based on a beam corresponding to a beam index indicated by the MAC CE;

wherein the feedback message is used for determining whether the BFR is successful by the terminal device, wherein the method further comprises sending, by the network, downlink scheduling information based on a physical downlink control channel (PDCCH) scrambled by a cell-radio network temporary identity (C-RNTI), and the downlink scheduling information is used by the terminal device for determining that the BFR is successful when the downlink scheduling information is received, and wherein the beam index is used by the terminal device to determine a downlink beam that meets a threshold condition, and take the downlink beam that meets the threshold condition as the beam corresponding to the beam index indicated by the MAC CE.

5. The method according to claim 4, wherein the beam index is indicated by a channel state information-reference signal (CSI-RS) index.

6. A terminal device, comprising: a processor, a transceiver, and a memory for storing a computer program that is capable of running on the processor, wherein:

the transceiver is configured to send a media access control (MAC) control element (CE) when a condition for triggering beam failure recovery (BFR) is met, the MAC CE indicating a beam index corresponding to a beam used for sending a feedback message by a network device, and the transceiver is further configured to receive the feedback message, the feedback message being sent by the network device based on the beam corresponding to the beam index indicated by the MAC CE, wherein the processor is configured to:

determine whether the BFR is successful based on the feedback message, determine that the BFR is successful when downlink scheduling information sent by the network device is received, wherein the downlink scheduling information is sent by the network device based on a physical downlink control channel (PDCCH) scrambled by a cell-radio network temporary identity (C-RNTI), and determine, before sending the MAC CE, a downlink beam that meets a threshold condition, and take the downlink beam that meets the threshold condition as the beam corresponding to the beam index indicated by the MAC CE, wherein resources used by the terminal device to send the MAC CE are configured based on dynamic scheduling or by using semi-static resources.

7. The terminal device according to claim 6, wherein the processor is further configured to:

determine that the BFR fails when the transceiver does not receive the downlink scheduling information sent by the network device.

8. The terminal device according to claim 6, wherein the beam index is indicated by a channel state information-reference signal (CSI-RS) index.

* * * * *